United States Patent
Sahu

(10) Patent No.: US 8,055,102 B1
(45) Date of Patent: Nov. 8, 2011

(54) LOCAL EDGE COUNT HEURISTIC FOR VECTOR INTERPOLATOR

(75) Inventor: Shilpi Sahu, Bangalore (IN)

(73) Assignee: Marvell International Ltd., Hamilton (BM)

( * ) Notice: Subject to any disclaimer, the term of this patent is extended or adjusted under 35 U.S.C. 154(b) by 1043 days.

(21) Appl. No.: 11/928,674

(22) Filed: Oct. 30, 2007

Related U.S. Application Data

(60) Provisional application No. 60/864,875, filed on Nov. 8, 2006.

(51) Int. Cl.
 *G06K 9/32* (2006.01)
 *H04N 7/01* (2006.01)

(52) U.S. Cl. ........ 382/300; 348/452

(58) Field of Classification Search .......... 382/300; 348/452
See application file for complete search history.

(56) References Cited

U.S. PATENT DOCUMENTS

| | | | | |
|---|---|---|---|---|
| 5,018,024 A * | 5/1991 | Tanioka | | 358/2.1 |
| 5,193,122 A * | 3/1993 | Kowalski et al. | | 382/173 |
| 5,619,272 A * | 4/1997 | Salmon et al. | | 348/452 |
| 5,661,525 A * | 8/1997 | Kovacevic et al. | | 348/452 |
| 5,995,154 A * | 11/1999 | Heimburger | | 348/448 |
| 6,798,422 B2 * | 9/2004 | Wang | | 345/611 |
| 6,940,557 B2 * | 9/2005 | Handjojo et al. | | 348/452 |
| 7,154,556 B1 * | 12/2006 | Wang et al. | | 348/452 |
| 7,414,671 B1 * | 8/2008 | Gallagher et al. | | 348/625 |
| 7,627,192 B2 * | 12/2009 | Yokochi | | 382/261 |
| 7,733,421 B1 * | 6/2010 | Sahu et al. | | 348/452 |
| 2003/0206667 A1 * | 11/2003 | Wang et al. | | 382/300 |
| 2004/0013315 A1 * | 1/2004 | Li et al. | | 382/268 |
| 2004/0120605 A1 * | 6/2004 | Lin et al. | | 382/300 |
| 2005/0078214 A1 * | 4/2005 | Wong et al. | | 348/452 |
| 2006/0268168 A1 * | 11/2006 | Au et al. | | 348/448 |
| 2007/0052845 A1 * | 3/2007 | Adams | | 348/452 |
| 2007/0103485 A1 * | 5/2007 | Lu et al. | | 345/606 |
| 2007/0177056 A1 * | 8/2007 | Zhou et al. | | 348/452 |

OTHER PUBLICATIONS

"Deinterlacing—An Overview," Gerard De Haan, et al., Proceedings of the IEEE, vol. 86, No. 9, Sep. 1998, pp. 1839-1857.*
"A Motion and Edge Adaptive Deinterlacing Algorithm," S. C. Tai, et al. 2004 IEEE International Conference on Multimedia and Expo (ICME), pp. 659-662.*

* cited by examiner

*Primary Examiner* — Wengpeng Chen

(57) ABSTRACT

A vector interpolator optimizes the conversion of an interlaced signal to a non-interlaced signal. The vector interpolator improves the visual clarity of slanted features in a displayed image by adjusting the luminance value of each pixel such that the appearance of "steps" or "jaggies" in the features is reduced. For each pixel, the vector interpolator determines a similarity measure for the pixels within a predetermined area around the pixel. From the similarity measure, an angle for interpolation is selected. The luminance value is then interpolated along the selected vector corresponding to the angle and applied to the pixel. One or more ambiguity measures such as a local edge count ambiguity measure may also be computed to indicate the reliability of the computed luminance value.

24 Claims, 11 Drawing Sheets

LOCAL EDGE COUNT HEURISTIC FOR VECTOR INTERPOLATOR

CROSS-REFERENCE TO RELATED APPLICATION

This application claims the benefit of U.S. Provisional Patent Application No. 60/864,875 filed Nov. 8, 2006. This application is related to commonly-assigned U.S. patent application Ser. No. 11/294,709, filed Dec. 5, 2005 (now U.S. Pat. No. 7,733,421). Both of these applications are hereby incorporated herein by reference in their entirety.

BACKGROUND OF THE INVENTION

The present invention generally relates to signal processing applications. More particularly, the present invention is related to a circuit, system, and method for a vector interpolator that provides pixel interpolation for spatial de-interlacing or scaling.

The formats selected for displaying video data have changed over time along with the supporting technologies for displaying the video in these formats. Many, if not most, currently used displays are interlaced due to type of programming available. Interlaced displays render alternate lines of the video every field. Interlacing alternates between drawing the even-numbered lines and the odd-numbered lines of each frame. However, interlaced displays are giving way to high definition progressive televisions.

Progressive or non-interlaced scanning is a method for displaying, storing or transmitting moving images in which the lines of each frame are drawn in sequence. Modern progressive scan displays do not suffer as much from line flicker or scan line visibility in comparison to interlaced displays. These advantages are more pronounced when the size of the display is large or when the screen is viewed from close proximity. However, despite the greater acceptance and use of progressive displays, much of the video material available for viewing or broadcasting is still in the interlaced standard definition format. To display an interlaced picture on a progressive display, the video may be converted to progressive format through a line-doubler or a de-interlacer. However, many line-doublers used as de-interlacers introduce display artifacts that reduce the quality of the video being displayed.

SUMMARY OF THE INVENTION

Briefly stated, a vector interpolator optimizes the conversion of an interlaced signal to a non-interlaced signal. The vector interpolator improves the visual clarity of slanted features in a displayed image by adjusting the luminance value of each pixel such that the appearance of "steps" or "jaggies" in the features is reduced. For each pixel, the vector interpolator determines a similarity measure for the pixels within a predetermined area around the pixel. From the similarity measure, an angle for interpolation is selected. The luminance value is then interpolated along the selected vector corresponding to the angle and applied to the pixel.

When a video display is de-interlaced, the scan line visibility is reduced due to the doubling the number of lines. The vector interpolator described herein improves the line-doubling process by interpolating the luminance values for the pixel from the surrounding pixels. As stated, by interpolating along a selected angle from the pixel to be generated, a more accurate luminance value is applied to the pixel. This method contrasts with doubling of lines by vertical interpolation, where the values applied to a newly generated pixel are interpolated from the pixels directly above and below the position for the new pixel. Doubling the lines by vertical interpolation gives rise to steps or "jaggies" in slanted features because the pixels directly above and below the pixel to be generated may not accurately reflect the display that should be provided for the newly generated pixel. Also, line flicker is not reduced by simple vertical scaling of the image. Therefore, the de-interlacer provided in conjunction with the vector interpolator described herein uses frame/field stores for 3-dimensional adaptive de-interlacing. A 3-D adaptive de-interlacer computes motion between the fields. When there is substantial motion between fields, spatial or intra-field de-interlacing is turned on and when there is no motion between fields, temporal or inter-field de-interlacing is turned on. In case of intermediate values of motion, output is a blend of the two kinds of de-interlacing. 3-D de-interlacing gets rid of line flicker in stationary areas of video, but the "jaggie" problem persists. These artifacts may be reduced by using the intelligent vector interpolator described herein. The vector interpolator computes the direction of the vectors and interpolates the pixel values in that direction. Using the vector interpolator produces a smooth progressive frame when motion content of the frame is high. The vector interpolator uses an area-efficient methodology with a number of controllable heuristics to compute the luminance value of the missing pixel along the direction of the edge passing through the missing pixel position. One or more ambiguity measures may also be computed that can indicate the reliability of these computed luminance values. For example, a local edge count ambiguity measure may be used to indicate the presence of frequent luminance variations that can adversely affect the reliability of the luminance values estimated by the vector interpolator.

Although the discussion herein refers to interpolating a luminance value for the pixel to be generated, the vector interpolator may be used to interpolate other values for the pixel as well (e.g., chrominance value and the like).

BRIEF DESCRIPTION OF THE DRAWINGS

Non limiting and non exhaustive embodiments are described with reference to the following drawings.

DETAILED DESCRIPTION OF THE INVENTION

Figure 1:
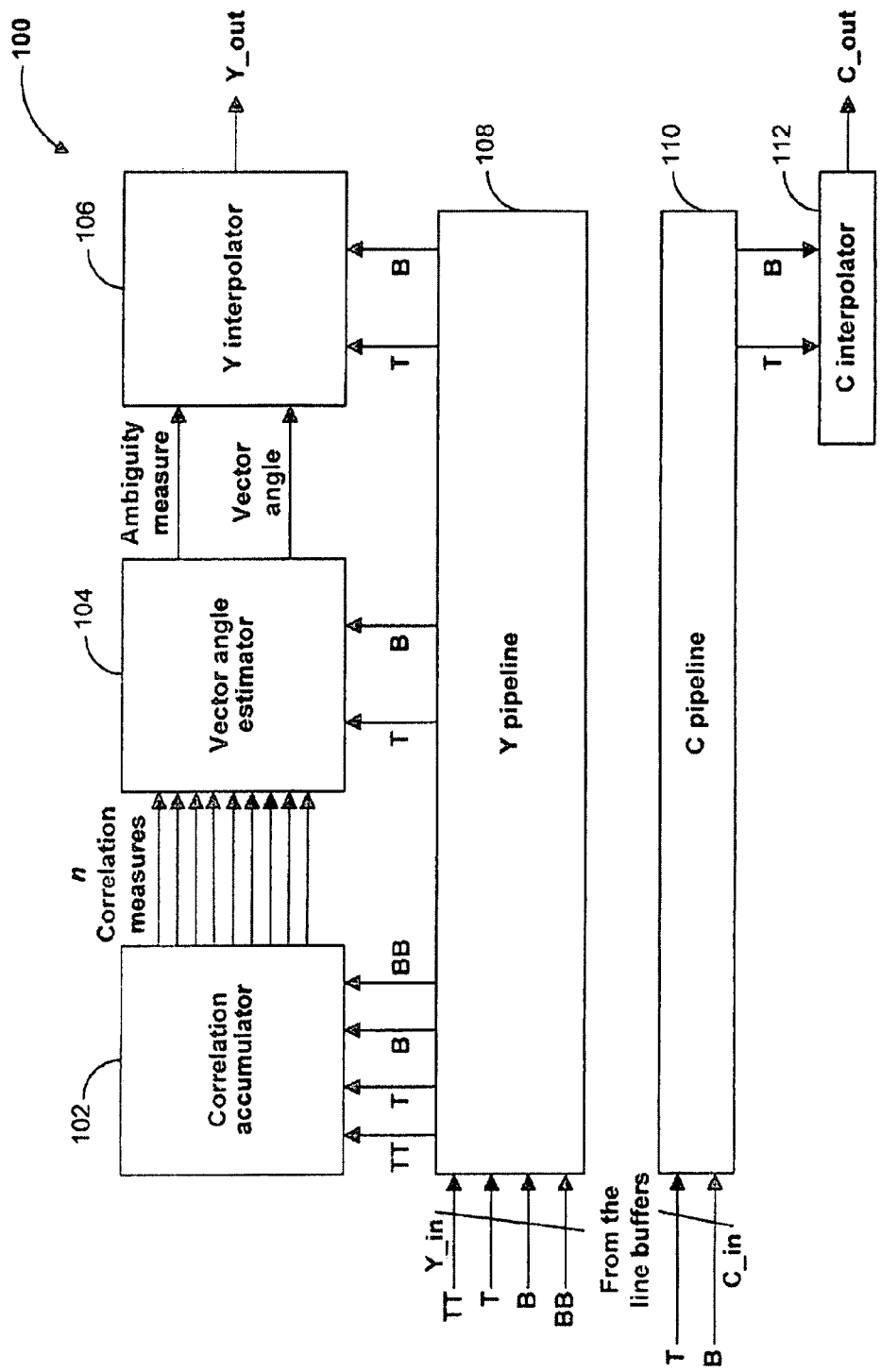
FIG. 1 illustrates a functional block diagram of an exemplary vector interpolator.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

FIG. 1 illustrates a functional block diagram of an exemplary vector interpolator, in accordance with the discussion herein. The vector interpolator (100) includes a correlation accumulator (102), a vector angle estimator (104), a Y interpolator (106), a Y pipeline (108), a C pipeline (110), and a C interpolator (112).

For the embodiment of FIG. 1, the correlation accumulator (102) and the vector angle estimator (104) are included in the interpolation process for the luminance value (Y_out) of pixels to be generated. In contrast, the determination of the chrominance value (C_out) does not include these modules in its interpolation process with only the chrominance pipeline (110) and the chrominance interpolator (112). The luminance (Y) is interpolated by estimating the orientation of a luminance vector passing through the pixel to be generated first. Chrominance, however, is determined by plain vertical averaging. Chrominance in a video frame has lower bandwidth (e.g., 0.6-1.3 MHz) as opposed to luminance bandwidth (e.g., 4.2 MHz) and does not contain very sharp transitions. Accordingly, plain vertical interpolation for chrominance doesn't result in any visible artifacts similar to the "jaggies" that result due to inaccurate selection of a luminance values for pixels to be generated. Although, there is a difference for handling chrominance and luminance in the embodiment shown, other embodiments may be used where chrominance is also interpolated by the method described herein for estimating the vector angle.

In operation, the Y pipeline (108) receives the luminance data (Y_in) for each line of a window around a pixel used for estimating the pixel's luminance value. In the example shown, four lines of data are input into the vector interpolator (100) that correspond to a top available line (T) (just above the missing pixel), a bottom available line (B) (just below the missing pixel), a second top available line (TT), and a second bottom available line (BB). This data is distributed by the Y pipeline (108) to the other modules for interpolating the luminance value for the pixels. When determining the "correlation" factor for the pixel to be determined, the vector interpolator (100) finds the region of similarity about the pixel. The term "correlation" is used here to define a similarity measure, which in the embodiments given here is defined such that lowest value represents greatest similarity. The pixel luminance value is found by interpolating along the region of similarity. For example, a pixel belonging to the line immediately above the missing line to be generated, and a pixel belonging to the line below may be used to interpolate the luminance value for the pixel. Any given pixel value in the missing line is calculated by averaging the pixels above and below, even if these pixels are not directly above and below the pixel to be generated. The vector interpolator (100) selects the interpolating pairs according to the direction of the vector passing through the missing pixel position (See FIG. 2). The correlation accumulator (102) and vector angle estimator (104) are used to gather the pixel data and select the vector to be used for the interpolation.

Figure 2:
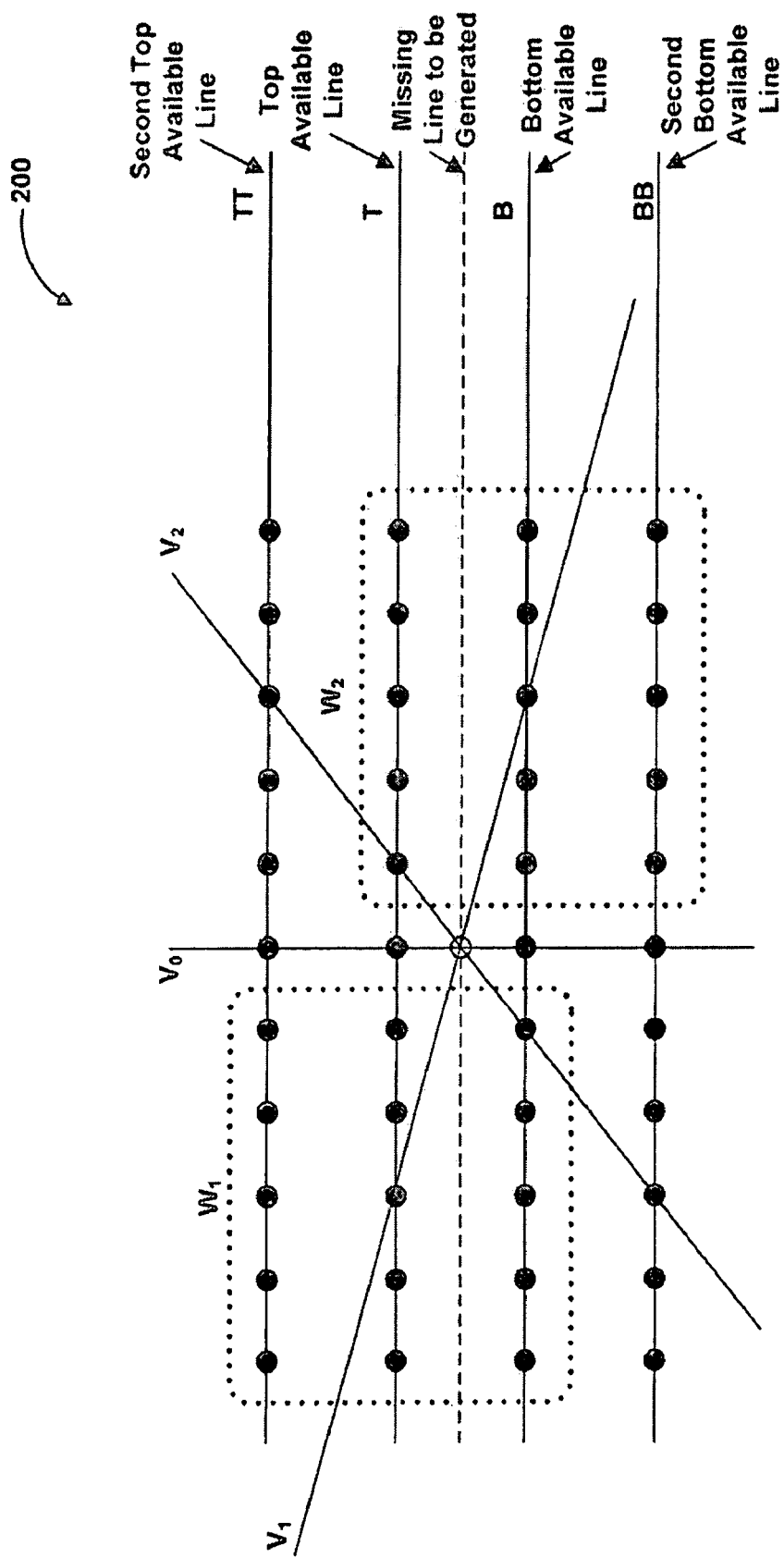
FIG. 2 illustrates an exemplary pixel graph that includes possible vectors for use in interpolating values for the pixel to be generated.

The correlation accumulator (102) computes a set of values reflecting the similarity of pixels along different directions around the missing pixel. A window of pixels is selected around the missing pixel. In FIG. 2, a window of 11×4 pixels around the missing pixel is shown. The direction of the vector inside this window is determined by matching the pixels surrounding the pixel whose luminance value is to be determined. When pixels match, the match usually corresponds to a feature that is passing through those pixels (e.g., a line). For example, line $v_0$ is the vector corresponding to vertical features, $v_1$ is one of the possible vectors corresponding to a left slanted feature and $v_2$ corresponds to a right slanted feature. Similarity or correlation in the direction $v_1$ is found by summing the absolute differences of the luminance values of the corresponding pixels in sub-windows $W_1$ and $W_2$ shown in FIG. 2.

$$\mathrm{Corr}_1 = \Sigma \mathrm{abs}(W_1(i,j) - W_2(i,j)) \qquad \text{(Eqn 1)}$$

A low correlation value indicates good similarity between regions $W_1$ and $W_2$ and high value indicates that the two regions are dissimilar. The correlations for each of the possible angles in the window formed around the missing pixel are computed. For example, in FIG. 2, with 5×3 sub-windows for calculating correlations, the number of possible angles is seven with the vectors $v_0$, $v_1$, and $v_2$ corresponding to just three. Usually, the position corresponding to the minimum correlation value (highest match) among the correlations calculated in the window results in a best possible estimate for the feature direction.

The number of correlation values is dependent on the window length selected and the sub-window length selected. Increasing the window size increases the number of possible angles vectors that can pass through the missing pixel, but also increases computational complexity and possibility of making mistakes in vector angle judgment. Selecting smaller sub-windows increases the number of angles inside a window of given size and also detect small features, but then $W_1$ and $W_2$ of FIG. 2 end up being determined as dissimilar so that their correlations are not reliable anymore and might be noisy. Accordingly, the window and sub-window sizes are carefully selected to get good angle coverage, detect sharp and small features and avoid picking up noise or spurious features.

The vector angle estimator (104) takes the similarity or correlation measures from the correlation accumulator (102) and determines the vector angle for interpolating the luminance of the pixel to be generated. In addition to selecting the angle, the vector angle estimator (104) may also provide a measure of confidence, or ambiguity measure, associated with the estimated vector direction. An exemplary process for making the angle estimation is provided below in the discussion of FIG. 4.

Once the angle of interpolation is known, the vector angle and the ambiguity measure are passed to the luminance (Y) interpolator (106). The Y interpolator (106) calculates the luminance values of pixels in the missing line by averaging the luminance values of the pixels along the vector angle selected. However, if the ambiguity measure associated with the calculated angle vector is large, the vertical pixels, used for vertical interpolation, may be selected. The final luminance value (Y_out) of the pixel is a weighted average between the vertically averaged value and the value calculated along the angle vector, the weighting factor being the ambiguity measure associated with the angle vector.

FIG. 2 illustrates an exemplary pixel graph that includes possible vectors for use in interpolating values for the pixel to be generated, in accordance with the present disclosure. Windows ($W_1$, $W_2$) correspond to vector $v_1$. It is the pixel luminance values of these windows ($W_1$, $W_2$) that are averaged to help estimate the luminance value of the pixel to be generated.

In the example shown, four lines of data are used in the interpolation that correspond to a top available line (T) (just above the missing pixel), a bottom available line (B) (just below the missing pixel), a second top available line (TT), and a second bottom available line (BB). The lines of data correspond to a selection made for the window size that surrounds the pixel to be generated. The four lines of data correspond to the 11×4 window used. The sub-windows ($W_1$, $W_2$) correspond to 5×3 selections of pixels that have their luminance values averaged to determine a luminance value for the pixel to be generated.

Figure 3:
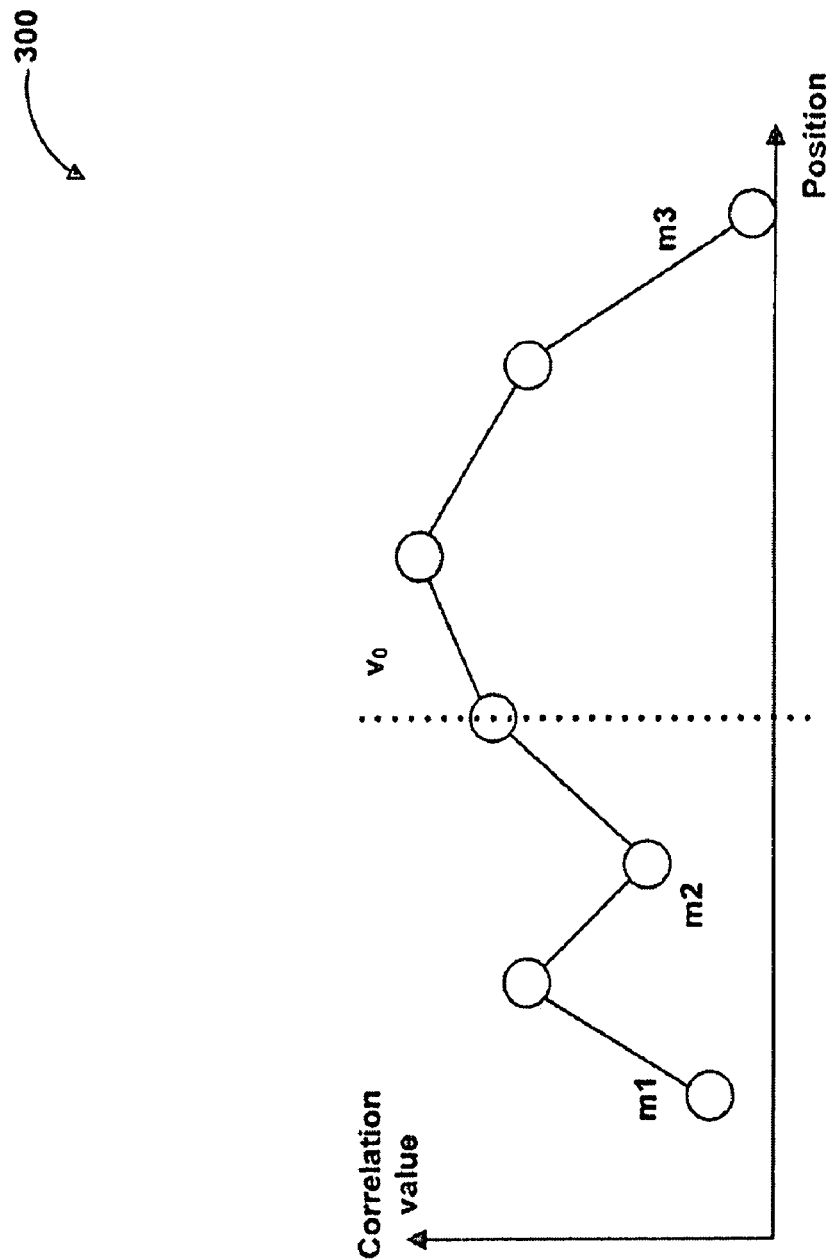
FIG. 3 illustrates a graph of a sample correlation profile for window surrounding a pixel to be generated.

FIG. 3 illustrates a graph of a sample correlation profile for window surrounding a pixel to be generated, in accordance with the present disclosure.

As previously stated, it is the minimum values of correlation that indicate the greater similarity of pixel values in that vector's direction. Often, however, correlation profiles may indicate more than one minimum. In that case, the deepest minimum position, or lowest correlation value is determined to correspond to the vector angle selection for interpolation. However, small features in the video such as thin parallel lines running at an angle, hair, window grates, and the like may give rise to complicated correlation profiles where even the deepest minimum does not match with the actual correct angle for interpolation. So, all the correlation minima values and positions are computed from the set of correlations and passed on to the next step for further processing.

The correlation profile of FIG. 3 includes three minima (m1, m2, m3). By visual inspection, m3 appears to be the deepest minima. However, m3 is furthest from the missing pixel to be computed and therefore is less reliable than m2. The minimum at m2 is closer than m1 and m3, but is not as deep. The heuristics for selecting which minima corresponds to the eventually selected vector angle, is a matter of selection of which rule to apply. In one example however, one rule may be that the minimum should be closest to the center. Selecting the minimum closest to the center, results in a decreased possibility of making an error. Farther minima angles get selected when there aren't any minima closer to the center.

Another rule may correspond to a determination that a chosen minimum is not very shallow. Noise or minor variations in the luminance value of the window can cause spurious minima. The threshold for rejecting shallow minima can be the mean of all the correlation values.

Furthermore, additional heuristics are used to determine reliability of chosen minima position. After the direction for interpolation is chosen, the direction may still not be correct. The additional heuristics indicate the reliability or robustness of the selection. The measure obtained by these rules is represented as an ambiguity metric and used to balance between the vertically averaged luminance value and the luminance value calculated by interpolating along the chosen direction.

Figure 4:
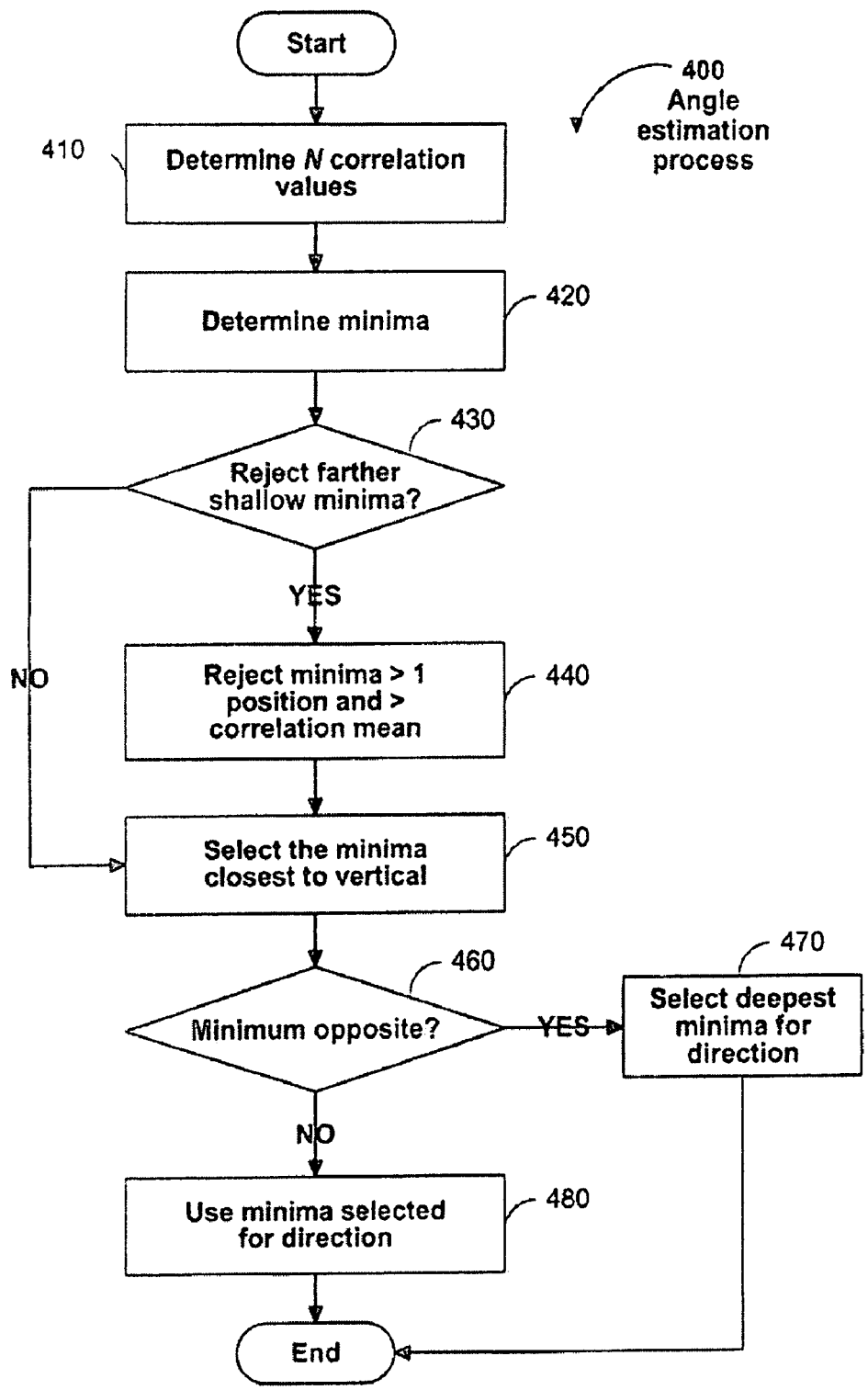
FIG. 4 illustrates a flow diagram of an exemplary process for estimating the vector angle used for interpolating a luminance value for a pixel to be generated.

FIG. 4 illustrates a flow diagram of an exemplary process for estimating the vector angle used for interpolating a luminance value for a pixel to be generated, in accordance with the present disclosure. Processing starts at operation 410 where N correlation values, or correlation measures are provided to the vector angle estimator (104 of FIG. 1). Processing continues at operation 420.

At operation 420, the minima are determined from the correlation values. The minima correspond to the possible vector angles used for interpolating a luminance value for the pixel to be generated. In one embodiment, a graph, or stored representation of a graph, similar to the correlation graph of FIG. 3 is used to determine the minima. Once the minima are determined, processing continues to decision operation 430.

At decision operation 430, a determination may be made to simply reject the minima further from the center that are more shallow than a closer minima, without further processing. If such minima are not rejected, processing advances to operation 450. However, if these minima are rejected, processing continues at operation 440.

Operation 440 rejects any minima over one position away from the center that are also greater than the correlation mean. Accordingly, even though these minima exist, they are not deep enough to be considered as corresponding to selectable vectors for interpolation and are rejected. Once these minima are rejected, processing continues with operation 450.

At operation 450, the minima position that is closest to the vertical position is selected. This selection of the closest minima position occurs whether or not the farther shallow minima were rejected. Once the minima position closest to the vertical position is selected, processing continues with decision operation 460.

At decision operation 460, a determination is made whether a minimum exists on the opposite side the vertical in the correlation graph that is the same distance from the vertical as the minima position selected. If no opposite minimum exists, processing moves to operation 480 where the minima already selected is used to provide the vector angle for interpolation. Once the vector angle is provided, process 400 ends and processing moves onto other tasks such as the interpolation of the luminance value.

In contrast, if an opposite minimum does exist, processing continues at operation 470. At operation 470, the deepest of the minima that are the same distance from the vertical is selected to provide the vector angle for interpolation. Once the vector angle is provided, process 400 ends and processing moves onto other tasks such as the interpolation of the luminance value.

Although the vector direction may be determined according to process 400, a determination is still made whether to use that vector's data for producing the luminance output. A confidence value is assigned to the interpolated result that weights the result, either in favor the luminance values produced by interpolating along the selected vector angle, or in favor of a luminance value produced by vertical interpolation as described above. The confidence value may be determined by a set of heuristics that create an ambiguity measure.

One factor that may assist in generating the ambiguity measure involves a determination of whether the correlation values are very similar for each of the vector angles. If the values are similar and there is not much variation in the correlation profile, then the choice of angle is not to be trusted. Slightly different correlation values may be caused by minor variations in a plain background or noise. Ambiguity associated with low correlation variation ($A_v$) is directly proportional to the ratio of the mean to the variation of the set of correlation values (Corr Set). For large variation in correlation values, the ambiguity is low, as may be seen from the following equation:

$$A_v \alpha \frac{\text{Mean (Corr Set)}}{\text{Var (Corr Set)}} \quad \text{(Eqn 2)}$$

For easier implementation, variation may be calculated as follows:

Var(Corr Set)=Mean(Corr Set)−Min(Corr Set)  (Eqn 3)

Figure 5A:
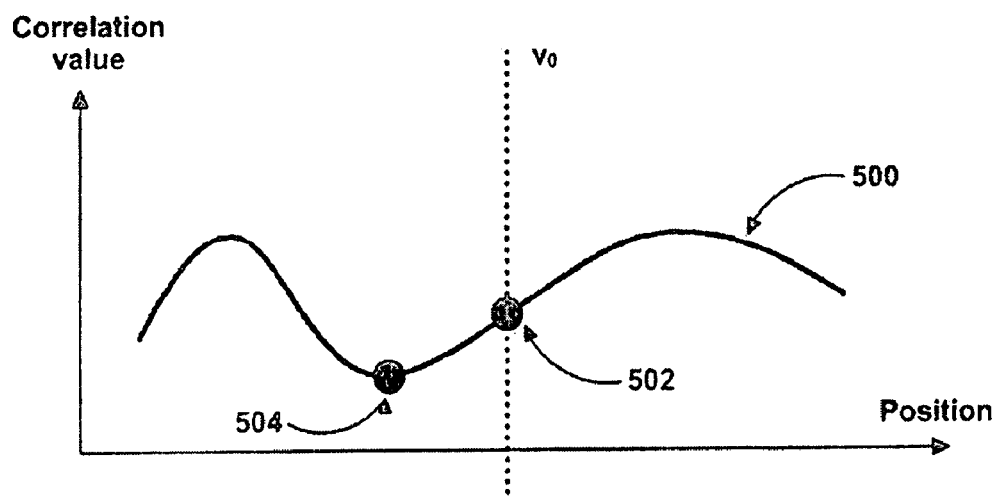
FIG. 5a and FIG. 5b illustrate a correlation graph with a wide correlation minimum and a correlation graph with a narrow correlation minimum, in accordance with the present disclosure.
Figure 5B:
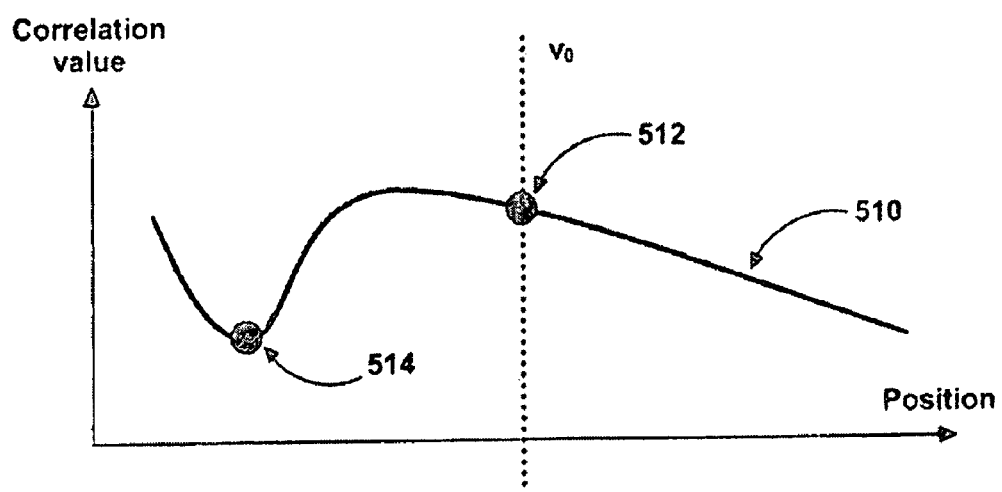

FIG. 5a and FIG. 5b illustrate a correlation graph with a wide correlation minimum and a correlation graph with a narrow correlation minimum, in accordance with the present disclosure. The figures illustrate another factor for the ambiguity measure referred to as a slope direction measure ($A_{slope}$). This ambiguity measure associates the slope of the correlation graph at the vertical position in the window ($v_0$ of FIG. 2) with the slope at a location immediately adjacent to the chosen minimum position, and toward the vertical position in the window. If both the slopes are in the same direction (say negative, e.g., FIG. 5a) then the matching slopes imply that the chosen minimum is wide enough to encompass even the vertical position. Stated differently, the vertical position lies in the depression caused by the chosen minimum. The same or similar slopes indicate a wide minimum and ensures that the minimum is not created by spurious noise. Usually, minima caused by noise shows up in correlation graph as sharper depressions in the graph (e.g., FIG. 5b).

$A_{slope}$ α sign (slope at minimum) XOR sign (slope at vertical position)  (Eqn 4)

After the process of FIG. 4, no other minima are between the chosen minimum and the vertical line ($v_0$) since the closest minimum from the vertical are selected. The shallow minima are rejected in noisy situations. But then, the effect of this particular noisy situation might be to raise the ambiguity flag, in which case, the vertically averaged luminance value gets more weight and any potential "wrong decision" is averted.

Another ambiguity factor involves high pass characteristics ($A_{hpf}$). Since a correlation value is based on sum of absolute differences, it often does not reflect the frequency content of the window very accurately. If the size of the feature is smaller than the size of the sub-windows used to calculate the correlation value, then the chance of getting false correlation peaks is high. False peaks and valleys and making a wrong decision of the vector angle are recognized by looking at the horizontal high pass characteristic of the pixels in the window.

$A_{hpf}$ α 0.5 ∗ Magnitude($HPF_{top\ line}$) + 0.5 ∗ Magnitude($HPF_{bottom\ line}$)  (Eqn 5A)

The ambiguity measure representing the high pass characteristics of the pixel to be estimated is proportional to the average of high pass magnitude of the top and bottom lines. A high magnitude indicates high frequency and therefore unreliable correlation minima positions.

In some embodiments, the HPF ambiguity measure $A_{hpf}$ may indicate that an estimated vector angle is incorrect or unreliable even when this estimated vector angle is correct and should be considered reliable. In particular, the HPF ambiguity measure $A_{hpf}$ may be used to detect when frequent luminance transitions or high HPF characteristic of the a window of pixels may lead to the determination of incorrect correlation values and incorrect edge estimates. For example, referring to FIG. 2, if pixels within the window have high frequency horizontal variations, such as alternate black and white luminance values, the determined correlation values along v1 may be incorrect. In this case, it may be preferable to interpolate along the vertical vector v0. Similarly, correlation values may be erroneous when attempting to de-interlace image portions having periodic structures such as hedges or window grills. The presence of high frequency periodic transitions can be determined by computing the magnitude of horizontal HPF characteristics of lines TT, T, B or BB. However, in some cases this computation may yield incorrect results. For example, a high pass filter may return a large value for a single large amplitude change in luminance values such as a single sharp transition between black and white regions. In this case, in spite of the estimated angle being correct, the HPF ambiguity measure $A_{hpf}$ may indicate that correlation values are unreliable and may cause the vector interpolator to interpolate in the vertical direction resulting in large visible jaggies. As a result, the HPF ambiguity measure $A_{hpf}$ may need to be turned off for test sequences which are in black and white or contain sharp dark and light transitions.

Figure 6:
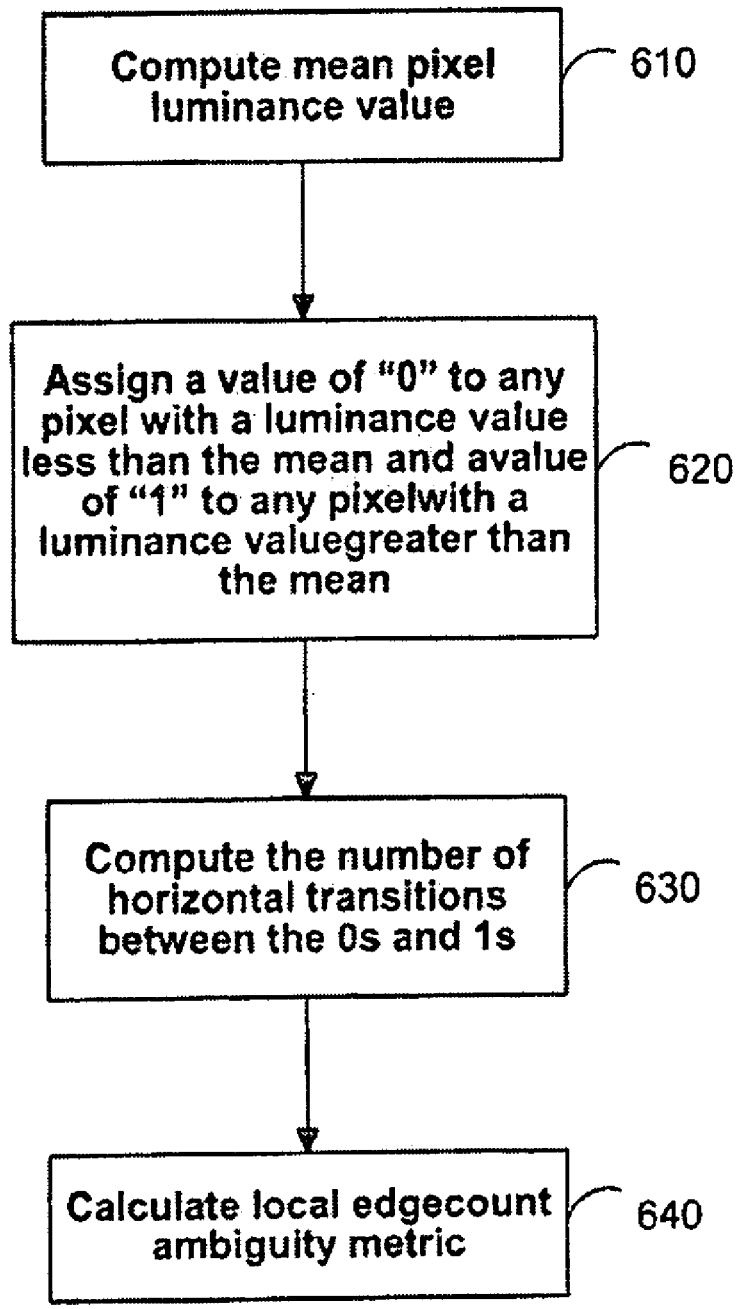
FIG. 6 illustrates a flow diagram of an exemplary process for estimating illustrative steps for computing a local edge count ambiguity measure $A_{lec}$.

This limitation of the HPF ambiguity measure $A_{hpf}$ may be solved by replacing the HPF ambiguity measure $A_{hpf}$ with a local edge count ambiguity measure $A_{lec}$. FIG. 6 illustrates a flow diagram of an exemplary process for estimating illustrative steps for computing a local edge count ambiguity measure $A_{lec}$. It should be understood that other suitable steps may also be used to compute an edge count ambiguity measure $A_{lec}$ in accordance with the present invention. At step 610 the mean of the pixel luminance values for a window of pixels surrounding the missing pixel may be computed. This window of pixels can be the same window of pixels that is used to estimate the angle of the edge passing through the missing pixel. At step 620, any pixel in the window with a luminance value less than the mean may be assigned a value '0' and any pixel with a luminance value greater than the mean may be assigned a value '1'. Then at step 630, the number of horizontal transitions between consecutive 0s and 1s in all of the lines within the window may be computed. This computation may be performed using an exclusive-OR (XOR) operation between neighboring pixels. Finally, at step 640 the local edge count ambiguity measure $A_{lec}$ may be calculated as being directly proportional to the total number of horizontal luminance transitions found in the window.

$A_{lec}$ α Number of Horizontal Luminance Transitions  (Eqn 5B)

As described above, the local edge count may be determined in relation to the mean luminance value of the pixel window instead of a fixed luminance value threshold. Thus, the number of detected luminance transitions should not be affected by the local brightness levels of the pixels. In this respect, the results of local edge count ambiguity measure $A_{lec}$ may be similar to the HPF heuristic at detecting high frequency transitions in the pixel window. However, because the output magnitude of the linear high pass filter is directly proportional to the amplitude of the edges (and not just their frequency), this technique would result in high values for single large amplitude luminance transitions, which is not useful for the current purpose. In contrast, the local edge count ambiguity measure $A_{lec}$ would provide the same transitions count irrespective of the transitions amplitudes. Therefore the local edge count ambiguity measure $A_{lec}$ may be low for a single large amplitude edge (where the estimated interpolation angle is usually correct), but may be higher for frequent luminance variations (where estimated angle is usually incorrect). Thus it can be seen that the local edge count heuristic may provide a more reliable ambiguity measure than the HPF heuristic in certain situations most notably, involving single or very few large amplitude horizontal transitions.

From equations 2, 4, 5A and 5B, up to four ambiguity measures $A_v, A_{slope}, A_{hpf}, A_{lec}$ can be calculated. Each ambiguity measure may have an individual select option. When the select option for a particular ambiguity measure is set to 1, the corresponding ambiguity measure may be selected to calculate an overall ambiguity measure (A). When the select option is set to 0, the corresponding ambiguity measure may not be used. The overall ambiguity measure (A) may be estimated by taking the maximum of all the selected ambiguity measures. This measure is passed on to the pixel interpolator module and acts as a weighting factor between the estimated interpolation angle and the vertical direction for calculating the luminance value. The measure may be expressed as follows:

$$A=\text{Max}(sel\_A_{hpf}*A_{hpf}, sel\_A_{lec}*A_{lec}, sel\_A_{slope}*A_{slope}, sel\_Av*Av) \quad \text{(Eqn 6)}$$

In equation 6, $sel\_A_{hpf}$, $sel\_A_{lec}$, $sel\_A_{slope}$ and $sel\_A_v$ are the select enables for the high-pass, local-edge count, slope and variance based ambiguity measures respectively. The local edge count and HPF ambiguity measures are generally not enabled at the same time as these two measures are based on similar properties. Furthermore, other techniques for blending the one or more selected ambiguity measures may be used to compute the overall ambiguity measure A including, but not limited to, calculating one or more the mean, median, or variance of at least some of the selected variables.

The overall ambiguity measure (A) may be used as a blending factor, which is used to blend the interpolated output in the selected direction with the vertically interpolated output, as follows:

$$Y_{out}=(1-A)*Y_{interpolated}+A*Y_{vertically\ interpolated} \quad \text{(Eqn 7)}$$

The vector interpolator combines the overall ambiguity measure (as a weighting factor) along with the vertical average luminance value and the average luminance value along the selected vector angle. The vector interpolator, therefore, allows for a much more accurate estimation of the luminance for a pixel. Used over the entire de-interlacing or scaling process, the vector interpolator provides for better picture without all of the artifacts associated with other de-interlacing techniques.

Referring now to FIGS. 7A-7E, various exemplary implementations of the present invention are shown.

Figure 7A:
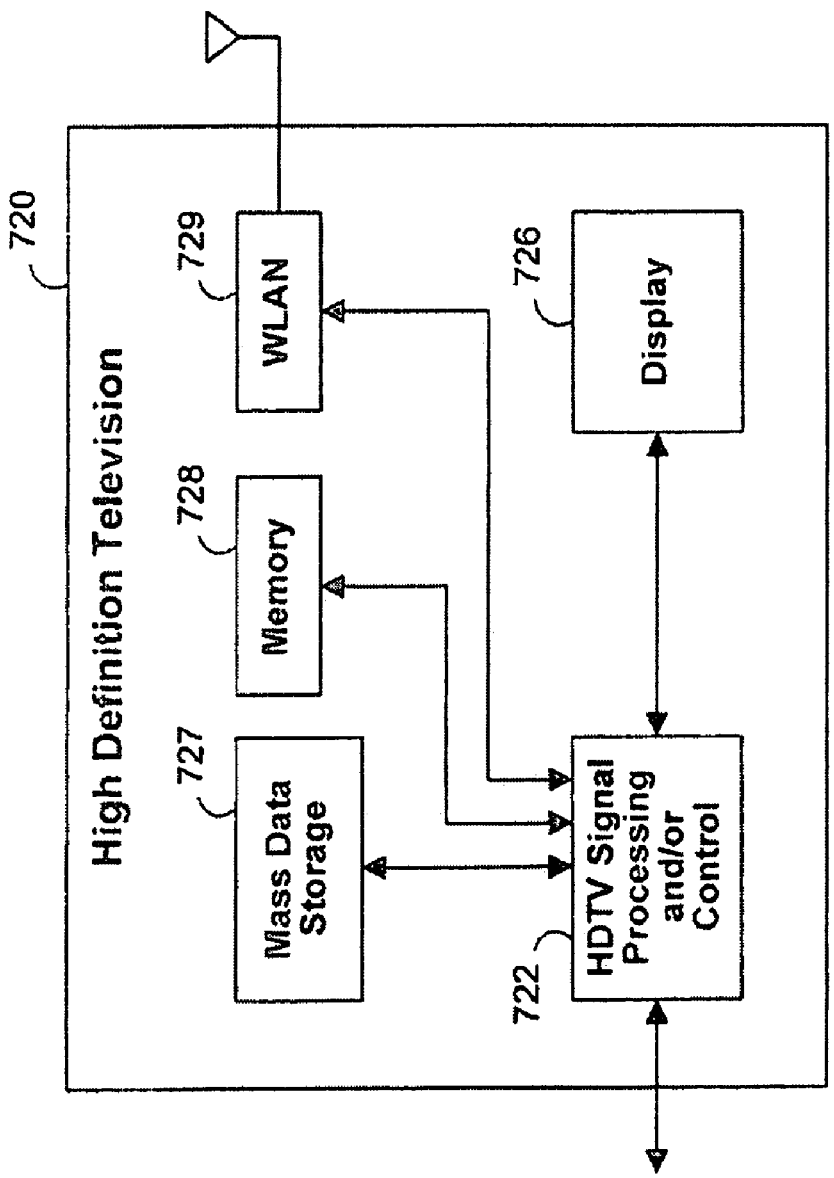
FIG. 7A is a block diagram of an exemplary high definition television that can employ the disclosed technology.

Referring now to FIG. 7A, the present invention can be implemented in a high definition television (HDTV) 720. The present invention may implement either or both signal processing and/or control circuits, which are generally identified in FIG. 7A at 722, a WLAN interface 729 and/or mass data storage 727 of the HDTV 720. The HDTV 720 receives HDTV input signals in either a wired or wireless format and generates HDTV output signals for a display 726. In some implementations, signal processing circuit and/or control circuit 722 and/or other circuits (not shown) of the HDTV 720 may process data, perform coding and/or encryption, perform calculations, format data and/or perform any other type of HDTV processing that may be required.

The HDTV 720 may communicate with mass data storage 727 that stores data in a nonvolatile manner such as optical and/or magnetic storage devices including hard disk drives (HDDs) and digital versatile disk (DVD) drives. The HDD may be a mini HDD that includes one or more platters having a diameter that is smaller than approximately 1.8". The HDTV 720 may be connected to memory 728 such as RAM, ROM, low latency nonvolatile memory such as flash memory and/or other suitable electronic data storage. The HDTV 720 also may support connections with a WLAN via the WLAN interface 729.

Figure 7B:
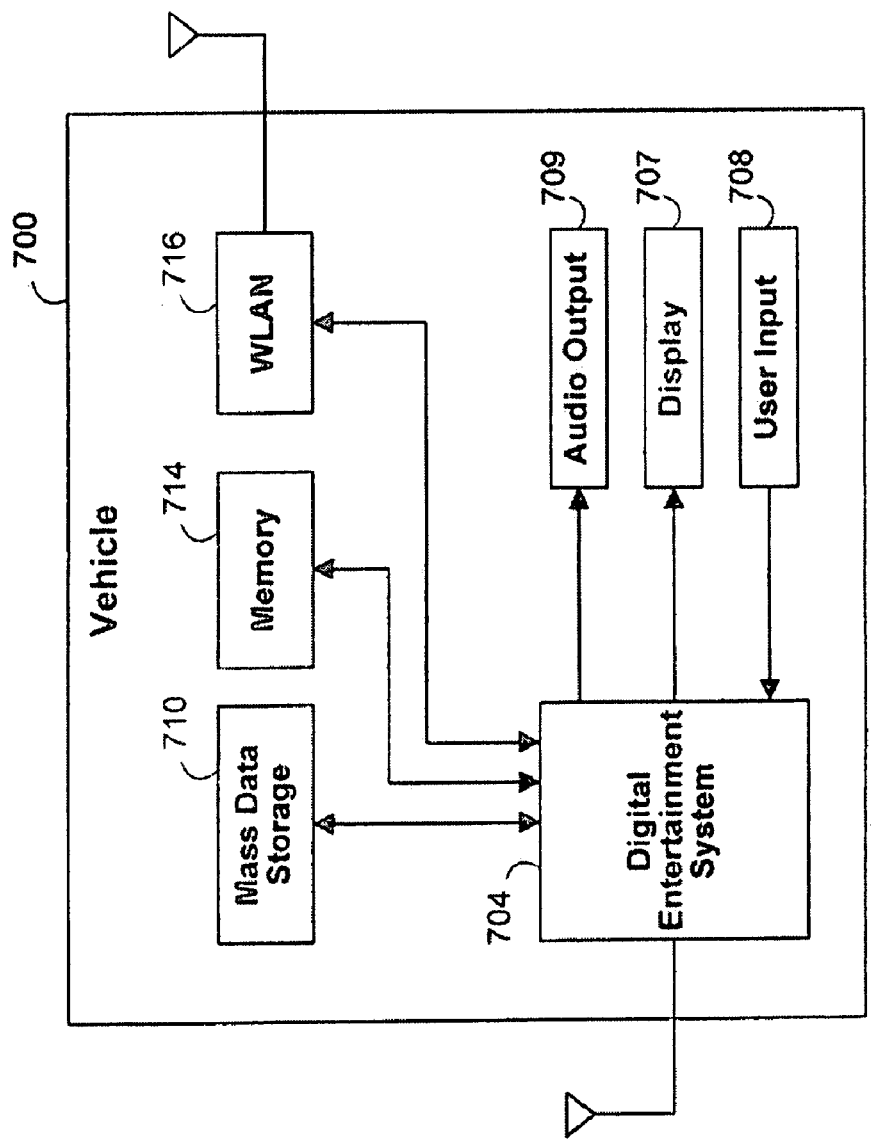
FIG. 7B is a block diagram of an exemplary vehicle that can employ the disclosed technology.

Referring now to FIG. 7B, the present invention may be implemented in a digital entertainment system 704 of a vehicle 700, which may include a WLAN interface 716 and/or mass data storage 710.

The digital entertainment system 704 may communicate with mass data storage 710 that stores data in a nonvolatile manner. The mass data storage 710 may include optical and/or magnetic storage devices such as hard disk drives (HDDs) and/or DVD drives. The HDD may be a mini HDD that includes one or more platters having a diameter that is smaller than approximately 1.8". The digital entertainment system 704 may be connected to memory 714 such as RAM, ROM, low latency nonvolatile memory such as flash memory and/or other suitable electronic data storage. The digital entertainment system 704 also may support connections with a WLAN via the WLAN interface 716.

Figure 7C:
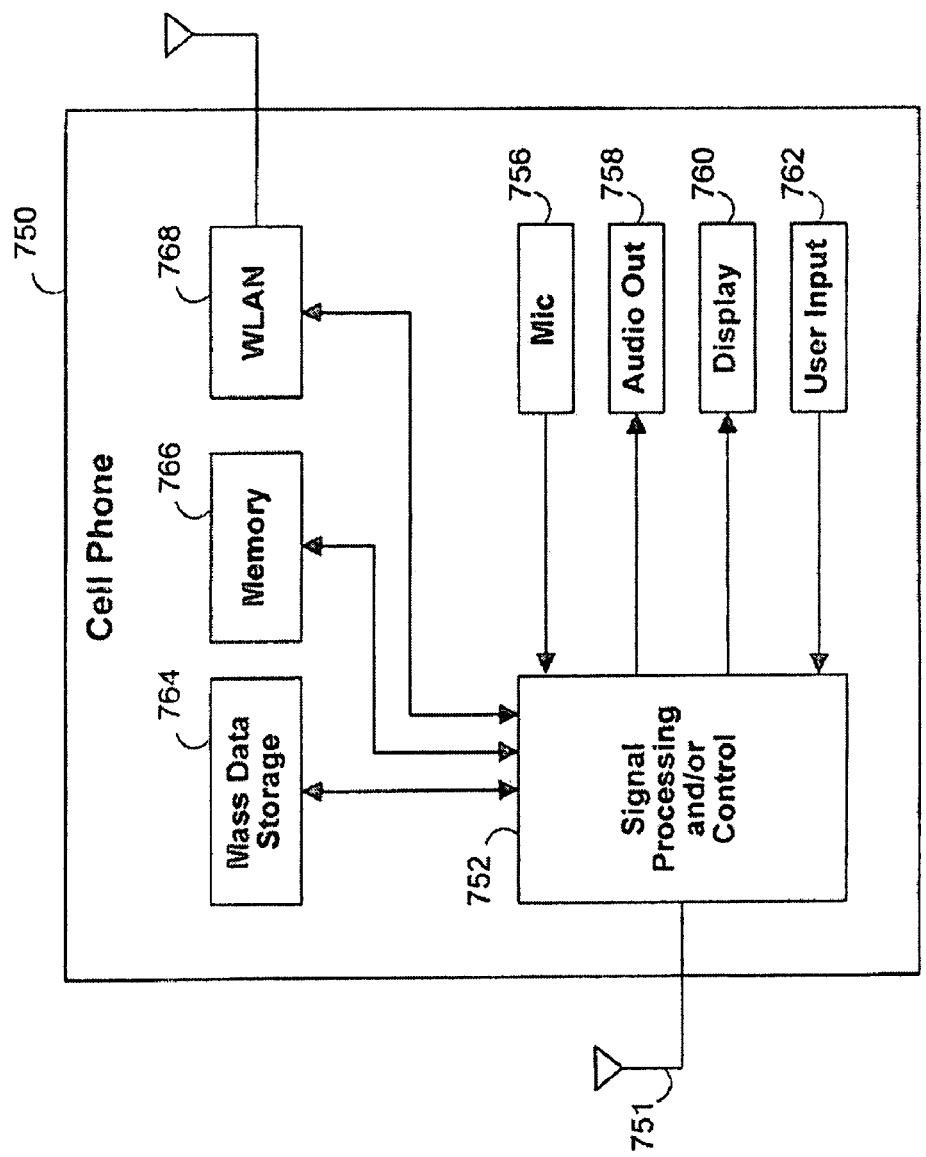
FIG. 7C is a block diagram of an exemplary cell phone that can employ the disclosed technology.

Referring now to FIG. 7C, the present invention can be implemented in a cellular phone 750 that may include a cellular antenna 751. The present invention may implement either or both signal processing and/or control circuits, which are generally identified in FIG. 7C at 752, a WLAN interface 768 and/or mass data storage 764 of the cellular phone 750. In some implementations, the cellular phone 750 includes a microphone 756, an audio output 758 such as a speaker and/or audio output jack, a display 760 and/or an input device 762 such as a keypad, pointing device, voice actuation and/or other input device. The signal processing and/or control circuits 752 and/or other circuits (not shown) in the cellular phone 750 may process data, perform coding and/or encryption, perform calculations, format data and/or perform other cellular phone functions.

The cellular phone 750 may communicate with mass data storage 764 that stores data in a nonvolatile manner such as optical and/or magnetic storage devices including hard disk drives (HDDs) and/or DVD drives. The HDD may be a mini HDD that includes one or more platters having a diameter that is smaller than approximately 1.8". The cellular phone 750 may be connected to memory 766 such as RAM, ROM, low latency nonvolatile memory such as flash memory and/or other suitable electronic data storage. The cellular phone 750 also may support connections with a WLAN via the WLAN interface 768.

Figure 7D:
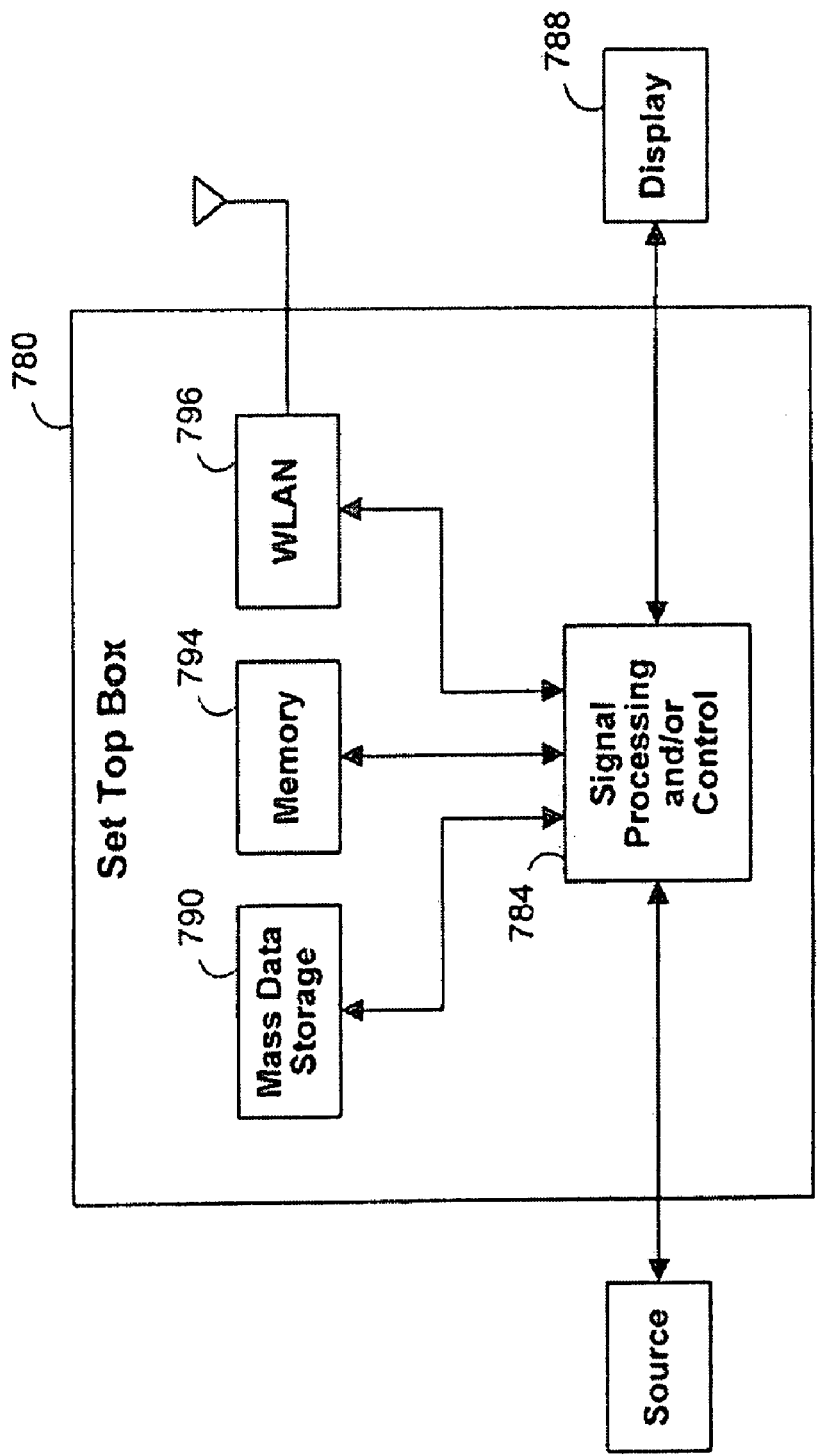
FIG. 7D is a block diagram of an exemplary set top box that can employ the disclosed technology.

Referring now to FIG. 7D, the present invention can be implemented in a set top box 780. The present invention may implement either or both signal processing and/or control circuits, which are generally identified in FIG. 7D at 784, a WLAN interface 796 and/or mass data storage 790 of the set top box 780. The set top box 780 receives signals from a source such as a broadband source and outputs standard and/or high definition audio/video signals suitable for a display 788 such as a television via monitor and/or other video and/or audio output devices. The signal processing and/or control circuits 784 and/or other circuits (not shown) of the set top box 780 may process data, perform coding and/or encryption, perform calculations, format data and/or perform any other set top box function.

The set top box 780 may communicate with mass data storage 790 that stores data in a nonvolatile manner. The mass data storage 790 may include optical and/or magnetic storage devices such as hard disk drives (HDDs) and/or DVD drives. The HDD may be a mini HDD that includes one or more platters having a diameter that is smaller than approximately 1.8". The set top box 780 may be connected to memory 794 such as RAM, ROM, low latency nonvolatile memory such as flash memory and/or other suitable electronic data storage. The set top box 780 also may support connections with a WLAN via the WLAN network 796.

Figure 7E:
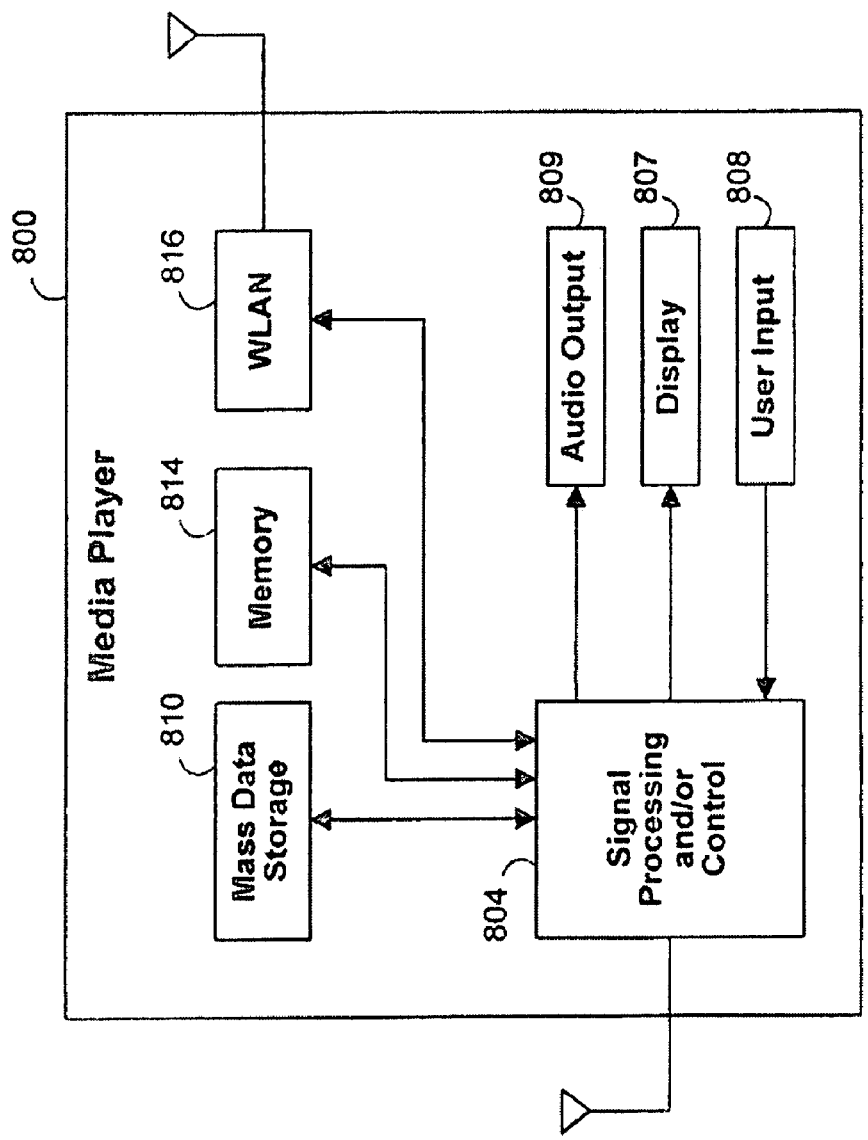
FIG. 7E is a block diagram of an exemplary media player that can employ the disclosed technology.

Referring now to FIG. 7E, the present invention can be implemented in a media player 800. The present invention may implement either or both signal processing and/or control circuits, which are generally identified in FIG. 7E at 804, a WLAN interface 816 and/or mass data storage 810 of the media player 800. In some implementations, the media player 800 includes a display 807 and/or a user input 808 such as a keypad, touchpad and the like. In some implementations, the media player 800 may employ a graphical user interface (GUI) that typically employs menus, drop down menus, icons and/or a point-and-click interface via the display 807 and/or user input 808. The media player 800 further includes an audio output 809 such as a speaker and/or audio output jack. The signal processing and/or control circuits 804 and/or other circuits (not shown) of the media player 800 may process data, perform coding and/or encryption, perform calculations, format data and/or perform any other media player function.

The media player 800 may communicate with mass data storage 810 that stores data such as compressed audio and/or video content in a nonvolatile manner. In some implementations, the compressed audio files include files that are compliant with MP3 format or other suitable compressed audio and/or video formats. The mass data storage 810 may include optical and/or magnetic storage devices such as hard disk drives (HDDs) and/or DVD drives. The HDD may be a mini HDD that includes one or more platters having a diameter that is smaller than approximately 1.8". The media player 800 may be connected to memory 814 such as RAM, ROM, low latency nonvolatile memory such as flash memory and/or other suitable electronic data storage. The media player 800 also may support connections with a WLAN via the WLAN interface 816. Still other implementations in addition to those described above are contemplated.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for determining the accuracy of an estimated value for a pixel being generated within a window of pixels, comprising:
   determining, using a signal processor, a value of each pixel in the window of pixels;
   computing a mean value for the window of pixels;
   comparing the determined value of each pixel in the window of pixels with the mean value to determine whether each pixel is less than or greater than the mean value;
   determining the number of times a pixel having a determined value less than the mean value is horizontally adjacent to a pixel having a determined value greater than the mean value; and
   generating, using the signal processor, an ambiguity measure proportional to the determined number, wherein the ambiguity measure is used to produce the estimated value for the pixel being generated.

2. The method of claim 1, wherein determining the values of the pixels comprises determining luminance values of the pixels.

3. The method of claim 1, wherein determining the values of the pixels comprises determining chrominance values of the pixels.

4. The method of claim 1, wherein comparing the determined value of each pixel with the mean value comprises assigning a value of 0 to the pixels having determined values less than the mean value and assigning a value of 1 to pixels having determined values greater than the mean value.

5. The method of claim 4, wherein determining the number of times a pixel having a determined value less than the mean value is horizontally adjacent to a pixel having a determined value greater than the mean value comprises using an XOR operation on the assigned values of each pair of horizontally adjacent pixels and adding outputs of the XOR operation.

6. The method of claim 1, wherein the ambiguity measure is proportional to the number of edges in the window.

7. The method of claim 1, further comprising blending a first interpolated value and a second interpolated value to produce the estimated value for the pixel being generated, wherein the first interpolated value and the second interpolated value are blended using the ambiguity measure as a blending factor.

8. The method of claim 1, further comprising blending the ambiguity measure with at least one other ambiguity measure to provide an overall ambiguity measure.

9. The method of claim 1, wherein the ambiguity measure is used as a blending factor.

10. A vector interpolator comprising an ambiguity measure calculator operative to:
   determine a value of each pixel in a window of pixels;
   compute a mean value for the window of pixels surrounding a pixel being generated;
   compare the determined value of each pixel in the window of pixels with the mean value to determine whether each pixel is less than or greater than the mean value;
   determine the number of times a pixel having a determined value less than the mean value is horizontally adjacent to a pixel having a determined value greater than the mean value; and
   generate an ambiguity measure proportional to the determined number, wherein the ambiguity measure is used to produce an estimated value for the pixel being generated.

11. The vector interpolator of claim 10, wherein determining the values of the pixels comprises determining luminance values of the pixels.

12. The vector interpolator of claim 10, wherein determining the values of the pixels comprises determining chrominance values of the pixels.

13. The vector interpolator of claim 10, wherein comparing the determined value of each pixel with the mean value comprises assigning a value of 0 to the pixels having determined values less than the mean value and assigning a value of 1 to pixels having determined values greater than the mean value.

14. The vector interpolator of claim 13, wherein determining the number of times a pixel having a determined value less than the mean value is horizontally adjacent to a pixel having a determined value greater than the mean value comprises using an XOR operation on the assigned values of each pair of horizontally adjacent pixels and adding outputs of the XOR operation.

15. The vector interpolator of claim 10, wherein the ambiguity measure is proportional to the number of edges in the window.

16. The vector interpolator of claim 10, further operative to blend a first interpolated value and a second interpolated value to produce the estimated value for the pixel being generated, wherein the first interpolated value and the second interpolated value are blended using the ambiguity measure as a blending factor.

17. The vector interpolator of claim 10, further operative to blend the ambiguity measure with at least one other ambiguity measure to provide an overall ambiguity measure.

18. An apparatus for determining the accuracy of an estimated value for a pixel being generated within a window of pixels, comprising:
- means for determining a value of each pixel in the window of pixels;
- means for computing a mean value for the window of pixels;
- means for comparing the determined value of each pixel in the window of pixels with the mean value to determine whether each pixel is less than or greater than the mean value;
- means for determining the number of times a pixel having a determined value less than the mean value is horizontally adjacent to a pixel having a determined value greater than the mean value; and
- means for generating an ambiguity measure proportional to the determined number, wherein the ambiguity measure is used to produce the estimated value for the pixel being generated.

19. The apparatus of claim 18, wherein determining the values of the pixels comprises determining luminance values of the pixels.

20. The apparatus of claim 18, wherein the means for comparing the determined value of each pixel with the mean value comprises means for assigning a value of 0 to the pixels having determined values less than the mean value and assigning a value of 1 to pixels having determined values greater than the mean value.

21. The apparatus of claim 20, wherein the means for determining the number of times a pixel having a determined value less than the mean value is horizontally adjacent to a pixel having a determined value greater than the mean value comprises means for using an XOR operation on the assigned values of each pair of horizontally adjacent pixels and adding outputs of the XOR operation.

22. The apparatus of claim 18, wherein the ambiguity measure is proportional to the number of edges in the window.

23. The apparatus of claim 18, further comprising means for blending a first interpolated value and a second interpolated value to produce the estimated value for the pixel being generated, wherein the first interpolated value and the second interpolated value are blended using the ambiguity measure as a blending factor.

24. The apparatus of claim 18, further comprising means for blending the ambiguity measure with at least one other ambiguity measure to provide an overall ambiguity measure.

* * * * *